United States Patent [19]
Frances et al.

[11] Patent Number: 5,194,489
[45] Date of Patent: Mar. 16, 1993

[54] ORGANOPOLYSILOXANE COMPOSITION CONTAINING A CYCLOPENTENYL RADICAL AND CROSSLINKABLE TO GIVE AN ELASTOMER

[75] Inventors: Jean-Marc Frances, Villeurbanne; Frederic Leising, Mornant, both of France

[73] Assignee: Rhone-Poulenc Chimie, Courbevoie, France

[21] Appl. No.: 616,920

[22] Filed: Nov. 21, 1990

[30] Foreign Application Priority Data

Nov. 21, 1989 [FR] France .................. 89 15528

[51] Int. Cl.$^5$ .................................. C08K 5/24
[52] U.S. Cl. .................................. 524/731; 524/779; 528/15; 528/18; 528/19; 528/32
[58] Field of Search ............... 528/32, 15, 18, 19; 524/731, 779

[56] References Cited

U.S. PATENT DOCUMENTS

| | | | |
|---|---|---|---|
| 3,410,820 | 11/1968 | Harrod | 260/37 |
| 3,723,497 | 3/1973 | Baney | 528/32 |
| 4,272,415 | 6/1981 | Homan et al. | 524/14 |

FOREIGN PATENT DOCUMENTS

0282927 9/1988 European Pat. Off. .
WO81/01562 6/1981 PCT Int'l Appl. .

Primary Examiner—Melvyn I. Marquis
Attorney, Agent, or Firm—Burns, Doane, Swecker & Mathis

[57] ABSTRACT

The present invention relates to an organopolysiloxane composition, containing a cyclopentenyl radical, which is stable on storage in the absence of gaseous oxygen, in particular in the absence of atmospheric oxygen, and is crosslinkable to an elastomer in the presence of gaseous oxygen, originating in particular from the atmosphere, characterized in that it comprises:

(A) 100 parts of diorganopolysiloxane containing at least 3 cyclopentenyl radicals per molecule, each of these groups being directly linked, by a SIC bond, to a different silicon atom,
(B) a catalytically effective amount of a hardening catalyst and
(C) 0 to 250 parts of an inorganic filler.

Application of the compositions to the production of coatings or of seals.

11 Claims, No Drawings

ORGANOPOLYSILOXANE COMPOSITION CONTAINING A CYCLOPENTENYL RADICAL AND CROSSLINKABLE TO GIVE AN ELASTOMER

The present invention relates to an organopolysiloxane composition, containing a cyclopentenyl radical, which is stable in the absence of gaseous oxygen, in particular in the absence of atmospheric oxygen, and is crosslinkable to give an elastomer in the presence of gaseous oxygen, originating in particular from the atmosphere.

Single-component silicone compositions capable of crosslinking to give an elastomer by a polycondensation reaction, through exposure to atmospheric moisture, are well known to those skilled in the art and are described in numerous patent documents.

Silicone compositions crosslinkable in a thin layer under ultraviolet radiation are also well known and comprise diorganopolysiloxane base polymers which generally carry epoxy, (meth)acrylate and mercapto groups.

More recently, there have been described silicone compositions crosslinkable with gaseous oxygen, in particular with atmospheric oxygen. The base polymers are either silicone oils having a mercapto group (see, for example, U.S. Pat. Nos. 4,252,932 and 4,268,655) or having a 1,4-pentadienylene group (see U.S. Pat. No. 4,526,954).

Furthermore, European Patent EP-A-282 927 teaches the preparation of diorganopolysiloxane containing a dicyclopentenyl radical by partial hydrosilylation of a hydrogenoorganopolysiloxane, and European Patent EP-A-261 520 describes diorganopolysiloxanes containing a dicyclopentenyl radical in the silicone chain and/or at the chain end, by a hydrolysis, cohydrolysis and/or equilibration reaction, starting from a mixture of silanes containing hydrolysable or condensable groups and dicyclopentenyl radicals.

However, none of the above documents teaches that such diorganopolysiloxanes containing a dicyclopentenyl radical are capable of cold-crosslinking in the presence of gaseous oxygen, in particular atmospheric oxygen, and in the presence of a metallic hardening catalyst.

The present invention relates to an organopolysiloxane composition which is stable on storage in the absence of gaseous oxygen and is crosslinkable to an elastomer in the presence of gaseous oxygen, characterized in that it comprises:

(A) 100 parts of at least one diorganopolysiloxane containing a least 3 cyclopentenyl radicals per molecule, each of these radicals being directly linked to a different silicon atom, (B) a catalytically effective amount of a metallic hardening catalyst and (C) 0 to 250 parts of an inorganic filler.

The polymer (A) preferably corresponds to the formula:

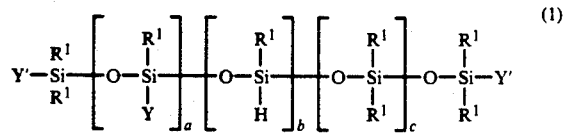

in which:

Y represents a cyclopentyl radical chosen from among those of the formula:

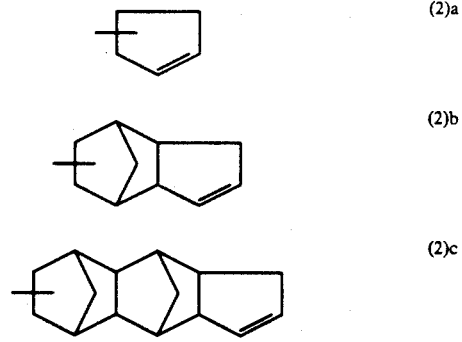

$R^1$ is a monovalent hydrocarbon radical, at least 50% of the number of $R^1$ radicals being methyl and/or phenyl, Y' is Y or $R^1$, a is an integer between 1 and 50 inclusive, b is an integer between 0 and 50 inclusive, and c is an integer between 0 and 1,000, preferably between 10 and 500, with the proviso that if $a=1$, Y' is Y, and if $a=2$, at least one of the two Y' is Y.

The polymer of formula (1) is substantially linear and its siloxane chain units are distributed randomly, in sequences or in blocks.

However, the presence in the chain of siloxane units of the formula $R^1SiO_{1.5}$ is not excluded, provided their content by numbers is at most 5%.

The radicals $R^1$ are more specifically chosen from among the $C_1$–$C_6$ alkyl radicals and phenyl.

The preferred polymers of the formula (1) are those which carry the radical of the formula (2)b and which are in the form of more or less viscous oils and accordingly have a viscosity at 25° C. of less than 500,000 mPa.s. The preferred range of viscosity lies between 1,000 and 250,000 mPa.s, it being understood that a mixture of polymers (1) of different viscosities can be used, the viscosity of the mixture having to be preferably less than 500,000 mPa.s.

There are several processes by means of which the polymer of the formula (1) may be obtained.

According to a first process, a polymer of the formula:

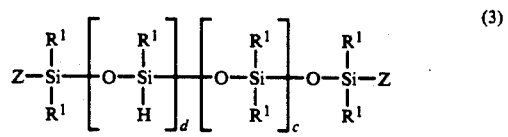

in which:

$R^1$ and c have the same meaning as in formula (1) above $d=a+b$, and

Z is $R^1$ or H, and if $d=1$, the two Z are H and if $d=2$, at least one of the Z is H, is subjected to an at least partial hydrosilylation reaction with dicyclopentadiene or its oligomers, in particular those chosen from among the formulae:

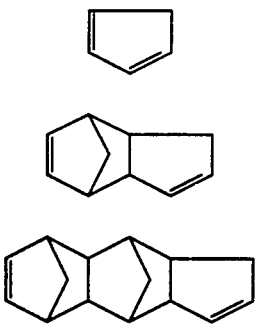

(4)a (4)b (4)c in the presence of a catalytically effective amount of a platinum catalyst.

The platinum catalysts used to carry out the hydrosilylation reaction of the polymers of the formula (3) with cyclopentadiene or its oligomers, of the formulae (4)a, (4)b and (4)c, are extensively described in the literature, and there may in particular be mentioned the complexes of platinum and an organic product, described in U.S. Pat. Nos. 3,159,601, 3,159,602, 3,220,972 and European Patents EP-A-57 459, EP-A-188 978 and EP-A-190 530, and the complexes of platinum and a vinylated organopolysiloxane, described in U.S. Pat. Nos. 3,419,593, 3,715,334, 3,377,432 and 3,814,730.

In order to react the polymer containing SiH groups, of the formula (3), with cyclopentadiene there is generally used an amount of platinum catalyst, calculated as weight of platinum metal, of between 5 and 600 ppm, preferably between 10 and 200 ppm, relative to the weight of polymer with SiH groups, of the formula (3).

The hydrosilylation reaction can be carried out in bulk or in a volatile organic solvent such as toluene, heptane, xylene, tetrahydrofuran and tetrachloroethylene.

It is generally desirable to heat the reaction mixture to a temperature of 60° to 120° C. for the time required to complete the reaction. Furthermore, it is desirable to add the polymer containing SiH groups dropwise to the cyclopentadiene dissolved in an organic solvent.

The extent to which the reaction has progressed is checked by determining the residual SiH groups with alcoholic potassium hydroxide, and thereafter the solvent is removed by, for example, distillation under reduced pressure.

The crude oil of the formula (1) can be purified, for example by passing it over an absorbent silica column.

Another process for the preparation of the polymers of the formula (1), for the case where b=0, consists of carrying out the homocondensation or cocondensation, followed optionally by an equilibration stage, of a mixture of silanes containing at least one silane of the formula

(6)

in which Y and $R^1$ have the meaning given in formula (1), e is 1 or 0 and X represents a hydrolysable group such as a chlorine atom or a $C_1$-$C_4$ alkoxy group.

Such a process is described in detail in European Patent EP-A-261 520, cited as a reference.

As hardening catalyst (B) it is possible to use, in particular, the monocarboxylic acid salts of metals such as barium, bismuth, calcium, cerium, cobalt, chromium, copper, iron, lead, magnesium, manganese, nickel, the rare earths, tin, zinc and zirconium. Other organic ligands may be bonded to the metals, such as chelate (acetylacetonate) and carbonyl ligands. The recommended catalysts are monocarboxylic acid salts of cobalt, iron, lead and bismuth and more particularly cobalt 2-ethylhexanoate.

By a catalytically effective amount of catalyst (B) there is understood an amount which is sufficient to ensure suitable crosslinking. Amounts of 0.01 to 5 parts, preferably 0.1 to 3 parts, by weight of metal salt per 100 parts by weight of polymer (A) are generally suitable.

The composition can furthermore contain a drying agent chosen, for example, from among the alkaline metal oxides and alkaline earth metal oxides.

It is recommended to add 0.1 to 5 parts of drying agents per 100 parts of oil (A).

It is also recommended, for the purpose of reducing the setting time, to add a redox agent of the type of iron oxide, copper sulphate and the like, for example in a dose of 0.1 to 3 parts per 100 parts of oil (A).

The mineral fillers (C) are used in a proportion of 0 to 250 parts, preferably 20 to 200 parts, per 100 parts of polymer (A).

These fillers can be in the form of very finely divided products whose mean particle diameter is less than 0.1 micrometre. These fillers include pyrogenic silicas and precipitated silicas; their BET specific surface area is generally greater than 40 m$^2$/g.

These fillers can also be in the form of more coarsely divided products, of mean particle diameter greater than 0.1 micrometre. As examples of such fillers there may be mentioned ground quartz, diatomaceous silicas, calcium carbonate, calcined clay, titanium oxide of the rutile type, oxides of iron, zinc, chromium, zirconium and magnesium, the various forms of alumina (which may or may not be hydrated, boron nitride, lithopone, barium metaborate, barium sulphate and glass microspheres; their specific surface area is generally less than 30 m$^2$/g.

These fillers (C) may have been surface-modified by treatment with the various organosilicon compounds usually employed for this purpose. Thus, these organosilicon compounds can be organochlorosilanes, diorganocyclopolysiloxanes, hexaorganodisiloxanes, hexaorganodisilazanes or diorganocyclopolysiloxanes (French Patents FR-A-1 126 884, FR-A-1 136 885 and FR-A-1 236 505 and British Patent GB-A-1 0247 234). The treated fillers in the majority of cases contain from 3 to 30% of their weight of organosilicon compounds.

The fillers (C) can consist of a mixture of various types of fillers of different particle size; thus, for example, they can consist of 5 to 95% of finely divided silicas of BET specific surface area greater than 40 m$^2$/g and of 95 to 5% of more coarsely divided silicas of specific surface area less than 30 m$^2$/g or of treated or untreated calcium carbonate.

According to an advantageous variant there is furthermore incorporated, into the elastomer composition, (D) a diorganopolysiloxane oil of the formula:

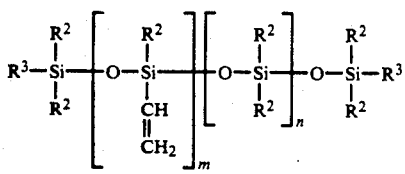

in which:

$R^2$ has the same meaning as $R^1$ in formula (1), and preferably $R^2$ is methyl and/or phenyl, $R^3$ is $R^2$ or vinyl, m is an integer between 0 and 100 inclusive and, if m is 0, $R^3$ is vinyl, and m and n are so chosen that the polymer of the formula (5) has a viscosity, at 25° C., which is less than 500,000 mPa.s and preferably between 100 and 20,000 mPa.s.

Preferably, 1 to 30 parts of oil of the formula (5) are added per 100 parts of oil (A).

The compositions according to the invention can furthermore contain the usual adjuvants or additives, conventionally used in the silicone elastomer compositions which are well known to those skilled in the art.

Among these adjuvants there may in particular be mentioned the plasticizers, which can be silicone oils or organic plasticizers. In particular, the plasticizers described in U.S. Pat. No. 4,525,565 can be used.

Among the other adjuvants or additives there may in particular be mentioned colouring pigments, adhesion promoters, heat stabilizers, antioxidants, fluidization agents, thixotropic agents, perfumes, and the like.

In order to produce the compositions according to the invention, it is necessary to use an apparatus which permits the various essential constituents, to which the abovementioned adjuvants and additives are optionally added, to be mixed intimately with exclusion of gaseous oxygen, with or without application of heat.

A more particularly recommended process is that which consists in introducing, in the stated sequence, the oil (A), the oil (D) where appropriate, the plasticizer where appropriate, the catalyst (B), the drier where appropriate and finally the filler (C), into a mixer, with heating where appropriate to a temperature of 50°–150° C., in the absence of atmospheric oxygen.

Thereafter, degassing is preferably carried out under a reduced pressure of, for example, between 0.01 and 10 kPa.

The compositions according to the invention are stable on storage in the absence of gaseous oxygen for at least 6 months and even one year, and can more particularly be used for sealing purposes in the building industry, for assembly of a great variety of materials (metals, plastics, natural and synthetic rubbers, wood, cardboard, earthenware, brick, ceramics, glass, stone, concrete and masonry components), for insulation of electrical conductors, for coating of electronic circuits, and for the preparation of moulds used for the manufacture of articles from synthetic resins or synthetic foams.

The compositions according to the invention can optionally be used after dilution with liquid organic compounds; the diluents are preferably conventional commercial products chosen from amongst:

aliphatic, cycloaliphatic and aromatic halogenated or non-halogenated hydrocarbons, such as cyclohexane and toluene, aliphatic and cycloaliphatic ketones such as methyl ethyl ketone, and esters such as ethyl acetate.

The amount of diluent in general remains low and is generally less than 50% by weight relative to the total weight of the composition.

The abovementioned dilutions of these compositions in organic diluents are more especially useful for thin layer-impregnation of woven or non-woven articles or for coating metal foils or plastic or cellulose sheeting; however, they can be sprayed, for example by atomization with a paint gun, onto any substrates on which it is necessary to produce a coating having a thickness in the order of 5 to 300 μm. After the dilutions have been sprayed, the diluents evaporate and the compositions liberated harden to give a perfectly uniform rubbery film.

Furthermore, this elastomer film can serve as a non-toxic inert non-stick coating on various substrates in contact with foodstuffs, such as (1) wrapping papers for confectionery or frozen meats, (2) metal troughs useful for the preparation of ice cream and sorbets and (3) metal mesh on which bread dough is placed and moulded, and which is introduced, with its content, into the ovens for baking the bread. It can also be employed as a non-stick and non-toxic coating on materials in contact with the human body, such as compresses and special bandages for burns.

In the subsequent and preceding texts, parts and percentages are by weight, unless stated otherwise.

The examples which follow illustrate the invention.

In the formulae of these examples, Me represents a methyl radical and Y a dicyclopentenyl group of the formula $(2)_b$.

The mechanical properties of the elastomer compositions stored in an aluminium tube which is impervious to atmospheric oxygen are evaluated as follows:

The contents of a tube are spread, in the form of a 2 mm thick layer, exposed to the atmosphere, on a polyethylene sheet.

The time (tp) for skin formation, also referred to as the time to achieve tack-free touch, and the demoulding time (td) required to be able to pull the elastomer off the sheet, are measured.

The deposited layer is converted to a rubbery film; as soon as it is demouldable, the elastomer film is lifted off and, after ageing for x days at ambient temperature, the tensometric properties of the elastomers are measured, namely:

the SHORE A hardness (SAH) according to standard specification NF-T-51 109,
the tensile strength (TS) in MPa according to standard specification NF-T-46 002
the elongation at break (EB) in % according to standard specification NF-T-46 002,
the modulus (Y.M.) in MPa for an elongation of 100%.
} after ageing for x days

EXAMPLE 1

Preparation of a Grafted Dicyclopentadiene Oil 43.4 g of freshly distilled dicyclopentadiene, namely 0.328 mole, and 0.596 g of a solution, containing 3.2% of platinum (0.000098 gram atoms of Pt), of a catalyst as described in U.S. Pat. No. 3,220,972 of Nov. 30, 1965 in 2-ethylhexanol, are introduced into a (three-neck) glass reactor of 500 cc capacity, equipped with a condenser, a central stirrer paddle connected to a motor, and a temperature probe.

The mixture is heated to 70° C. over 20 minutes. 191 g of an α,ω-dimethylhydrogenopolymethylhydrogenodimethylsiloxane oil containing 0.17% by weight of hydrogen atoms, and having the average formula:

$$\text{H}-\underset{\underset{\text{Me}}{|}}{\overset{\overset{\text{Me}}{|}}{\text{Si}}}-\text{O}-\left[\underset{\underset{\text{Me}}{|}}{\overset{\overset{\text{Me}}{|}}{\text{Si}}}-\text{O}\right]_{119}\left[\underset{\underset{\text{H}}{|}}{\overset{\overset{\text{Me}}{|}}{\text{Si}}}-\text{O}\right]_{14.2}\underset{\underset{\text{Me}}{|}}{\overset{\overset{\text{Me}}{|}}{\text{Si}}}-\text{H} \quad \text{polymer H}$$

are then introduced by means of a dropping funnel.

The time for introducing the oil is 150 minutes, during which a temperature rise of 2° C. is observed. The mixture is then raised to 110° C. and this temperature is maintained for 240 minutes.

The heating is then stopped and the mixture is allowed to return to ambient temperature.

232 g of oil are then withdrawn and subsequently analysed.

Determination of the hydrogeno units indicates that no hydrogen linked to silicon remains, and infrared analysis confirms this observation.

This analysis is completed by a $^{29}$Si and $^{13}$C NMR spectroscopic study, which shows that only one of the double bonds of the dicyclopentadiene is hydrosilylated.

An oil (A) of the average formula:

$$\text{Y}-\underset{\underset{\text{Me}}{|}}{\overset{\overset{\text{Me}}{|}}{\text{Si}}}-\text{O}-\left[\underset{\underset{\text{Me}}{|}}{\overset{\overset{\text{Me}}{|}}{\text{Si}}}-\text{O}\right]_{119}\left[\underset{\underset{\text{Y}}{|}}{\overset{\overset{\text{Me}}{|}}{\text{Si}}}-\text{O}\right]_{14.2}\underset{\underset{\text{Me}}{|}}{\overset{\overset{\text{Me}}{|}}{\text{Si}}}-\text{Y}$$

is obtained.

EXAMPLE 2

Crosslinking Exposed to Atmospheric Oxygen

A typical composition is produced by mixing the following under nitrogen:
100 parts of the oil (A) obtained in Example 1,
35 parts of precipitated silica,
4.8 parts of pyrogenic silica, of specific surface area of 300 m²/g and
0.6 part of cobalt octoate containing 6% of cobalt.

The composition is allowed to crosslink exposed to atmospheric oxygen and the following properties result:

| | |
|---|---|
| tp | 2 hours |
| td | 24 hours |
| (SAH) - 3 days | 30 |
| (TS) - 3 days | 3 MPa |
| (EB) - 3 days | 20% |

EXAMPLE 3

Preparation of a Grafted Dicyclopentadiene Oil (B)

130.1 g of freshly distilled dicyclopentadiene, namely 0.984 mole, followed by 40 g of a solution containing 0.088% of Pt in cyclohexane, as described in U.S. Pat. No. 3,220,972, are introduced into a (three-neck) glass reactor of 1 liter capacity, equipped in the same way as the glass reactor used in Example 1.

The mixture is heated to 102° C. for 20 minutes. Thereafter, 580 g of the α,ω-dimethylhydrogenopolymethylhydrogeno-dimethylsiloxane oil H, identical to that described in Example 1, are introduced by means of a dropping funnel. The time for the introduction of the hydrogen-containing oil is 150 minutes.

The mixture is kept at 100° C. for 60 minutes.

The degree of conversion of the =SiH units is 30%.

The temperature is then raised to 140° C. for a further 180 minutes.

The degree of conversion of the =SiH units is 37%.

The heating is then stopped and the mixture is allowed to return to ambient temperature.

The reaction mixture is then evaporated at 110° C. for 120 minutes under 0.133 kPa. 614 g of polymer (B) are collected.

The % residual hydrogen originating from the unreacted =SiH is 0.096%.

Spectroscopic analysis confirms that an oil B) of average formula:

$$\text{Y}-\underset{\underset{\text{Me}}{|}}{\overset{\overset{\text{Me}}{|}}{\text{Si}}}-\text{O}-\left[\underset{\underset{\text{Me}}{|}}{\overset{\overset{\text{Me}}{|}}{\text{Si}}}-\text{O}\right]_{119}\left[\underset{\underset{\text{H}}{|}}{\overset{\overset{\text{Me}}{|}}{\text{Si}}}-\text{O}\right]_{10.2}\left[\underset{\underset{\text{Y}}{|}}{\overset{\overset{\text{Me}}{|}}{\text{Si}}}-\text{O}\right]_{4}\underset{\underset{\text{Me}}{|}}{\overset{\overset{\text{Me}}{|}}{\text{Si}}}-\text{Y}$$

has been obtained.

EXAMPLE 4

Preparation of a Grafted Dicyclopentadiene Oil C

The procedure followed is identical to that of Example 3.

120 g of dicyclopentadiene, followed by 0.7 g of a solution containing 3.2% of platinum in 2-ethylhexanol, as described in U.S. Pat. No. 3,220,972, are introduced.

519 g of the polymer H, used in Example 1, are then run over 150 minutes into the reaction mixture heated to 83° C. Whilst it is being run in, a further 0.2, 0.26, 0.34 and 0.3 g of the solution containing 3.2% of platinum are added successively after 26, 80, 100 and 150 minutes' reaction time.

When all has been run in, the % residual hydrogen is determined and is found to be 0.066.

The temperature is then raised to 110° C. over 240 minutes.

The reaction mixture is then evaporated at 90° C. over 120 minutes under 0.133 kPa.

574 grams of polymer are obtained from 628 g.

The % residual H is 0.062.

The oil C, of average formula:

$$\text{Y}-\underset{\underset{\text{Me}}{|}}{\overset{\overset{\text{Me}}{|}}{\text{Si}}}-\text{O}-\left[\underset{\underset{\text{Me}}{|}}{\overset{\overset{\text{Me}}{|}}{\text{Si}}}-\text{O}\right]_{119}\left[\underset{\underset{\text{H}}{|}}{\overset{\overset{\text{Me}}{|}}{\text{Si}}}-\text{O}\right]_{7.1}\left[\underset{\underset{\text{Y}}{|}}{\overset{\overset{\text{Me}}{|}}{\text{Si}}}-\text{O}\right]_{7.1}\underset{\underset{\text{Me}}{|}}{\overset{\overset{\text{Me}}{|}}{\text{Si}}}-\text{Y} \quad \text{polymer C}$$

is obtained.

EXAMPLE 5

Preparation of a Grafted Dicyclopentadiene Oil Mixed with an α,ω-divinylated Polydimethylsiloxane Oil 1.01 mole of rectified dicyclopentadiene and 0.85 g of a platinum solution as described in U.S. Pat. No. 3,220,972 and containing 3.2% of platinum are introduced into a 1 liter reactor equipped as in Example 1. The reaction mixture is raised to 80° C. and 590 g of oil H, used in Example 1, are then run in over 200 minutes.

When all has been run in, the mixture is kept for 60 minutes at 85° C. and then for 90 minutes at 140° C.

The % residual H is 0.054.

177 g of a polymer of average formula

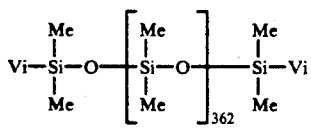

and of viscosity 3,500 mPa.s are then added at 85° C.

The temperature is kept at 85° C., and the stirring is continued, for 60 minutes.

The % residual H is 0.044.

The reaction mixture is then evaporated at 90° C. over 120 minutes under 0.133 kPa. 805 g of a mixture of devolatilized polymer E are obtained from 863 g of reaction mixture.

EXAMPLES 6 TO 9

Various compositions are prepared by mixing the oils synthesized in the preceding examples with silica and a crosslinking catalyst under nitrogen.

The set of mechanical properties found for 2 mm thick films crosslinking on exposure to atmospheric oxygen, as well as the composition of the mixtures produced, are set out in Table I below.

TABLE I

| Reference | Ex. 6 | Ex. 7 | Ex. 8 | Ex. 9 |
|---|---|---|---|---|
| Oil | B | E | E | C |
| Parts of oil | 200 | 200 | 600 | 200 |
| Parts of precipitated silica | 300 | 200 | 400 | 300 |
| Parts of 6% strength octoate | 3 | 2.4 | 6 | 2 |
| tp (minutes) | 480 | 300 | 300 | 200 |
| td (hours) | 80 | 60 | 72 | 48 |
| (SAH) after 4 days | 16 | 18 | 17 | 10 |
| (TS) after 7 days (MPa) | 3 | 2.49 | 2.6 | 0.6 |
| (EB) after 7 days | 45 | 59 | 68 | 100 |
| (YM) after 7 days (MPa) | — | 7.3 | 5 | — |

EXAMPLE 10

109 g of distilled dicyclopentadiene and 188 mg of an 8.7% platinum solution in hexane, the platinum complex being as described in Example 3 of U.S. Pat. No. 3,814,730, are introduced into a glass reactor of 3 liters capacity, having a central stirrer.

The reaction mixture is brought to 60° C. under nitrogen, with stirring, after which the introduction of a polymethylhydrogenosiloxane oil of average formula

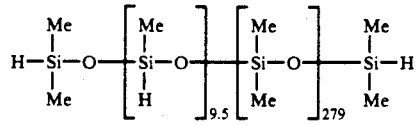

is started.

1,526 g of this oil are run in over 190 minutes at 60° C., under nitrogen.

The mixture is then left at 60° C. for 12 hours.

The degree of conversion of the =SiH groups is 91%.

The residual dicyclopentadiene is removed under reduced pressure, namely 0.133 kPa, at 70° C. over the course of 4 hours.

An oil F of average formula

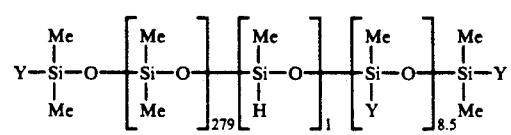

is obtained.

As elastomer composition is produced in the absence of air by mixing, in a 3 liter glass reactor, 1,000 parts of F, 100 parts of pyrogenic silica (Aerosil ® 150) and 10 parts of 6% strength cobalt octoate.

The elastomer formed has the following properties:

| | |
|---|---|
| tp | 24 hours |
| td | 72 hours |
| (SAH) - 7 days | 41 |
| (TS) - 7 days | 1 MPa |
| (EB) - 7 days | 90% |
| (YM) - 7 days | 1.4 MPa. |

We claim:

1. An organopolysiloxane composition which is stable on storage in the absence of gaseous oxygen and is crosslinkable to an elastomer in the presence of gaseous oxygen comprising:
   (A) 100 parts of at least one diorganopolysiloxane containing at least 3 cyclopentenyl radicals per molecule, each of these radicals being directly linked to a different silicon atom,
   (B) a catalytically effective amount of a metallic hardening catalyst capable of crosslinking said diorganopolysiloxane (A), and
   (C) 0 to 250 parts of an inorganic filler
   said organopolysiloxane composition including no hydrogen atoms linked to silicon atoms.

2. A composition according to claim 1 wherein the polymer (A) corresponds to the formula

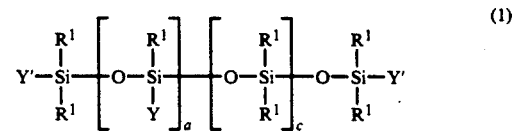

(1)

in which:

Y represents a cyclopentenyl radical chosen from among those of formula:

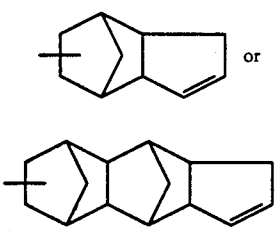

$R^1$ is a monovalent hydrocarbon radical, at least 50% of the number of $R^1$ radicals being methyl and/or phenyl, Y' is Y or $R^1$, a is an integer between 1 and 50 inclusive, c is an integer between 0 and 1,000, with the proviso that if $a=1$, Y' is Y, and if $a=2$, at least one of the two Y' is Y.

3. A composition according to claim 2 wherein the polymer (1) has a viscosity of between 1,000 and 250,000 mPa.s and $R^1$ is methyl.

4. A composition according to claim 1, wherein the catalyst (B) is a monocarboxylic acid salt of a metal and is present in an amount of 0.01 to 3 parts by weight of salt per 100 parts of oil (A).

5. A composition according to claim 4 wherein the metal is cobalt, iron, manganese, lead, bismuth or cerium.

6. A composition according to claim 5 wherein the catalyst is cobalt 2-ethylhexanoate.

7. A composition according to claim 2 wherein the composition further comprises a diorganopolysiloxane oil of the formula

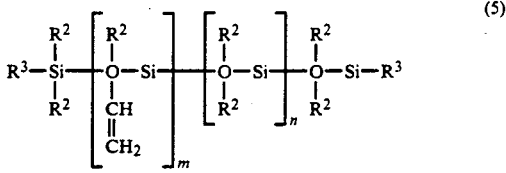

in which:

$R^2$ has the same meaning as $R^1$ in formula (1), $R^3$ is $R^2$ or vinyl, m is an integer between 0 and 100 inclusive and, if m is 0, $R^3$ is vinyl, and m and n are chosen that the polymer of the formula (5) has a viscosity, at 25° C., which is less than 500,000 mPa.s.

8. A composition according to claim 1 comprising from 0.1 to 5 parts of drying agents, chosen from among the alkali metal oxides or alkaline earth metal oxides, per 100 parts per oil (A).

9. A composition according to claim 1 further comprising 0.1 to 3 parts of a redox agent per 100 parts of oil (A).

10. A composition according to claim 2 wherein (c) is an integer between 10 and 500.

11. A composition according to claim 7 wherein $R^2$ is at least one of methyl and phenyl.

* * * * *